United States Patent
Riordan

Patent Number: 5,953,748
Date of Patent: *Sep. 14, 1999

[54] PROCESSOR WITH AN EFFICIENT TRANSLATION LOOKASIDE BUFFER WHICH USES PREVIOUS ADDRESS COMPUTATION RESULTS

[75] Inventor: Thomas J. Riordan, Los Altos, Calif.

[73] Assignee: Wuantum Effect Design, Inc., Santa Clara, Calif.

[*] Notice: This patent is subject to a terminal disclaimer.

[21] Appl. No.: 08/732,862

[22] Filed: Oct. 15, 1996

Related U.S. Application Data

[62] Division of application No. 08/189,007, Jan. 28, 1994, Pat. No. 5,606,683.

[51] Int. Cl.$^6$ ............................................. G06F 12/00
[52] U.S. Cl. ............................ 711/207; 711/6; 711/203
[58] Field of Search ......................... 711/207, 6, 203

[56] References Cited

U.S. PATENT DOCUMENTS

| | | | |
|---|---|---|---|
| 4,251,860 | 2/1981 | Mitchell et al. | 711/220 |
| 5,150,471 | 9/1992 | Tipon et al. | 711/220 |
| 5,179,674 | 1/1993 | Williams et al. | 711/204 |
| 5,263,140 | 11/1993 | Riordan | 711/207 |
| 5,335,333 | 8/1994 | Hinton et al. | 711/207 |
| 5,381,537 | 1/1995 | Baum et al. | 711/206 |
| 5,420,992 | 5/1995 | Killian et al. | 395/500 |

*Primary Examiner*—Jack A. Lane
*Attorney, Agent, or Firm*—Skjerven, Morrill, MacPherson, Franklin & Friel LLP

[57] ABSTRACT

A structure and a method are provided in a table lookaside buffer (TLB) for translating a virtual memory address to a physical memory address. The virtual memory address is computed by adding to a base address an offset value. In the TLB of the present invention, each entry of the TLB is stored a previous base address, a partial sum of the previous virtual memory address computation, the sign bit of the previous offset value, and the value of the carry bit at the position of the sign bit of the previous offset value in the previous virtual memory address computation. The present invention is especially applicable to a data TLB used in conjunction with a two-way set associative data cache memory.

3 Claims, 4 Drawing Sheets

| ENTRY BASE [63-16] = BASE [63-16] | ENTRY SUM [15-12] = SUM [15-12] | ENTRY CARRY | ENTRY OFFSET | CARRY | OFFSET | CASE |
|---|---|---|---|---|---|---|
| = | = | 0 | 0 | 0 | 0 | NATURAL MATCH |
| = | = | 1 | 1 | 1 | 1 | NATURAL MATCH |
| = | = | 1 | 0 | 1 | 0 | NATURAL MATCH |
| = | = | 0 | 1 | 0 | 1 | NATURAL MATCH |
| = | = | 0 | 0 | 1 | 1 | WRAP-AROUND |
|  |  | 1 | 1 | 0 | 1 | WRAP-AROUND |

FIG. 4

PROCESSOR WITH AN EFFICIENT TRANSLATION LOOKASIDE BUFFER WHICH USES PREVIOUS ADDRESS COMPUTATION RESULTS

This application is a divisional of U.S. patent application Ser. No. 08/189,007 filed Jan. 28, 1994 and now U.S. Pat. No. 5,606,683.

BACKGROUND OF THE INVENTION

1. Field of the Invention

The present invention relates to high performance computers; and, in particular, relates to high performance computers providing a large virtual memory space.

2. Description of the Related Art

A virtual memory system provides a computer programmer a large conceptual address space which is typically implemented in a much smaller physical address space for practical reasons. The physical addresses in the physical address space are used to access physical memory locations in which data or instructions are actually stored. The functions and the benefits of a virtual memory system are well-known.

Modern memory systems are almost always paged. Thus, in a virtual memory system supporting paging, to translate a virtual memory address into a physical memory address, a page table is used to map a portion of the virtual memory address into a corresponding physical memory page address, which is then used to derive the physical memory address.

In implementing such a virtual memory system, numerous approaches have been used to minimize the delay caused by looking up the page table. One such approach uses a translation look-aside buffer (TLB). A TLB, which is often content addressable using the virtual memory address, caches a number of the page table entries in current active use. In recent years, some designs, such as the Mips R2000, have implemented two levels of TLBs taking advantage that a smaller but faster first level TLB can be implemented economically to cache page table entries in the larger but slower second level TLB

SUMMARY OF THE INVENTION

In accordance with the present invention, a method and a structure provide a translation lookaside buffer (TLB) for translating a virtual memory address to a physical memory address. The present invention is applicable to a system in which a virtual memory address is computed by adding a base address to an offset value. In a TLB of the present invention, each entry of the TLB is provided a plurality of buffer entry circuits, each buffer entry circuit including (i) a matching unit for comparing components of a current virtual memory address computation to corresponding components of a previous virtual memory address computation; and (ii) a storage unit for storing a physical address corresponding to the result of the previous virtual memory address computation. When the comparison in the matching unit of one of the buffer entry circuits is successful, a signal is sent from the matching unit to a multiplexer to select as output data the physical address stored in the corresponding storage unit.

In one embodiment of the present invention, the matching unit compares (i) corresponding portions of the current and the previous base addresses, (ii) the sign bits of both the present and the current offset values, (iii) partial results of the previous and the current virtual address computation, and (iv) the carry bits of the current and the previous virtual addresses at the sign bit positions of the previous and the current offset values.

The principles of the present invention are applicable to an n-way set associative date cache memory, where $n \geq 2$, in which the physical address derived using the present invention is used to perform set selection. The present invention is also applicable to a computer having first and second levels of TLBs, where the present invention is used in a first level TLB.

The present invention provides a fast virtual-to-physical memory address translation which can be initiated simultaneously with the tag access operation in a data cache. Where set selection in such a data cache requires comparing tags derived from physical memory addresses, the present invention provides a virtual-to-physical memory address translation without requiring the virtual memory address to be completely computed, thereby preventing the virtual-to-physical memory address translation from becoming the limiting delay for cache access.

Furthermore, in an integrated circuit implementation, unlike a conventional TLB, which has become considerably large due to the size of a typical virtual memory space, the small size of the data TLB of the present invention allows the virtual portion of the data TLB address mechanism to be fitted in the data path of the microprocessor, thereby avoiding delays inherent in driving the wide virtual and physical memory address buses of the TLB over long distances.

The present invention is better understood upon consideration of the detailed description below and the accompanying drawings.

BRIEF DESCRIPTION OF THE DRAWINGS

FIG. 4 is a table showing the various conditions under which a "hit" occurs in DTLB 101, in accordance with the present invention.

DETAILED DESCRIPTION OF THE PREFERRED EMBODIMENTS

Figure 1:
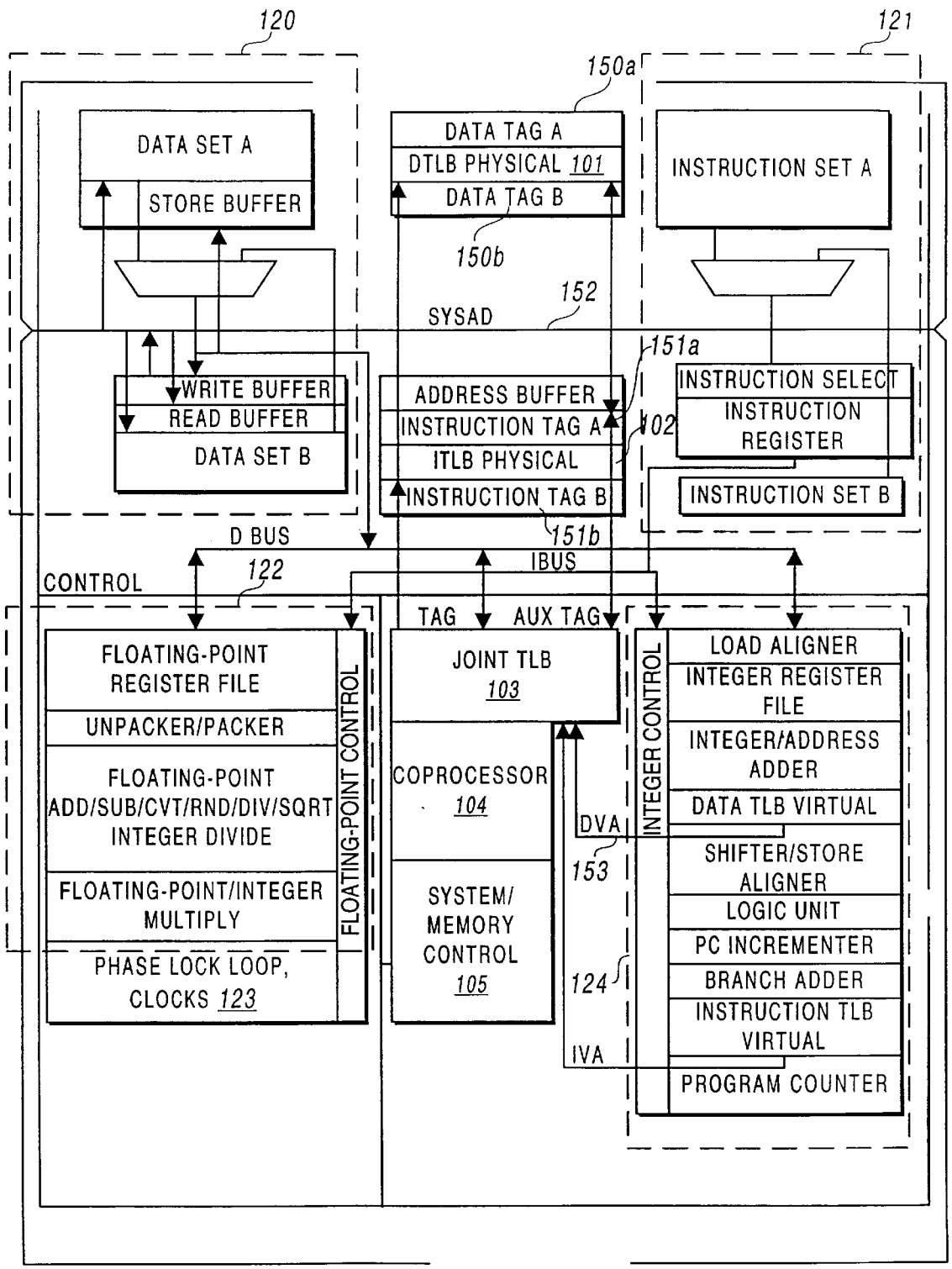
FIG. 1 is a block diagram of a microprocessor 100 having a data translation lookaside buffer (DTLB) 101 of the present invention.

FIG. 1 shows an embodiment of the present invention in a first level data translation lookaside buffer (DTLB) 101 of a 64-bit microprocessor 100. As shown in the block diagram of FIG. 1 and described below, microprocessor 100 has two levels of translation lookaside buffers (TLBs). The operations of microprocessor 100 are controlled by coprocessor unit 104 and system/memory control unit 105. Arithmetic and logical operations in microprocessor 100 are carried out in floating point unit 122 and integer unit 124.

Microprocessor 100 includes an instruction cache and a data cache each organized as a 16K-byte two-way set associative cache. As shown in FIG. 1, the instruction cache comprises an instruction portion 121 and instruction tag portions 151a and 151b. Instruction tags 151a and 151b are the two tag portions which are each compared to a physical memory address for set selection in the two-way set associative instruction cache. Likewise, the data cache comprises a data portion 120 and data tag portions 150a and 150b. Both the data cache and the instruction cache are virtually indexed by a virtual memory address and physically tagged by a physical memory address provided on system address bus 152.

Microprocessor 100 uses a 40-bit virtual memory address in three conventional operational modes: user, kernel and supervisor modes. In microprocessor 100 the 40-bit virtual memory address is provided by a 64-bit addition of a 64-bit base address and a 16-bit offset. When microprocessor 100 operates correctly in user mode, bits 40 to 60 in the result of the 64-bit addition are all zeroes. Virtual-to-physical memory address translation in microprocessor 100 is assisted by two levels of TLBs. In the first level, an instruction micro-TLB (ITLB) 102 and a data micro-TLB (DTLB) 101 are provided. The second level TLB is a joint TLB (JTLB) 103 for memory accesses to both data and instructions.

Cache tag access in microprocessor 100 is performed simultaneously with virtual-to-physical address translation. As mentioned above, the tags in the instruction and the data caches of microprocessor 100 are, however, physical addresses. This virtually indexed and physically tagged organization provides faster cache access and avoids extensive cache flushing during context switches. Such a cache organization also allows simultaneous cache access and virtual-to-physical memory address translation. Since both the instruction cache and the data cache of microprocessor 100 are two-way set associative caches, two sets of tags are compared in each cache to determine if a cache hit has occurred. Because the tags in each cache line are part of a physical memory address, set selection requires availability from the virtual-to-physical memory address translation the relevant bits of the physical address.

Figure 2:
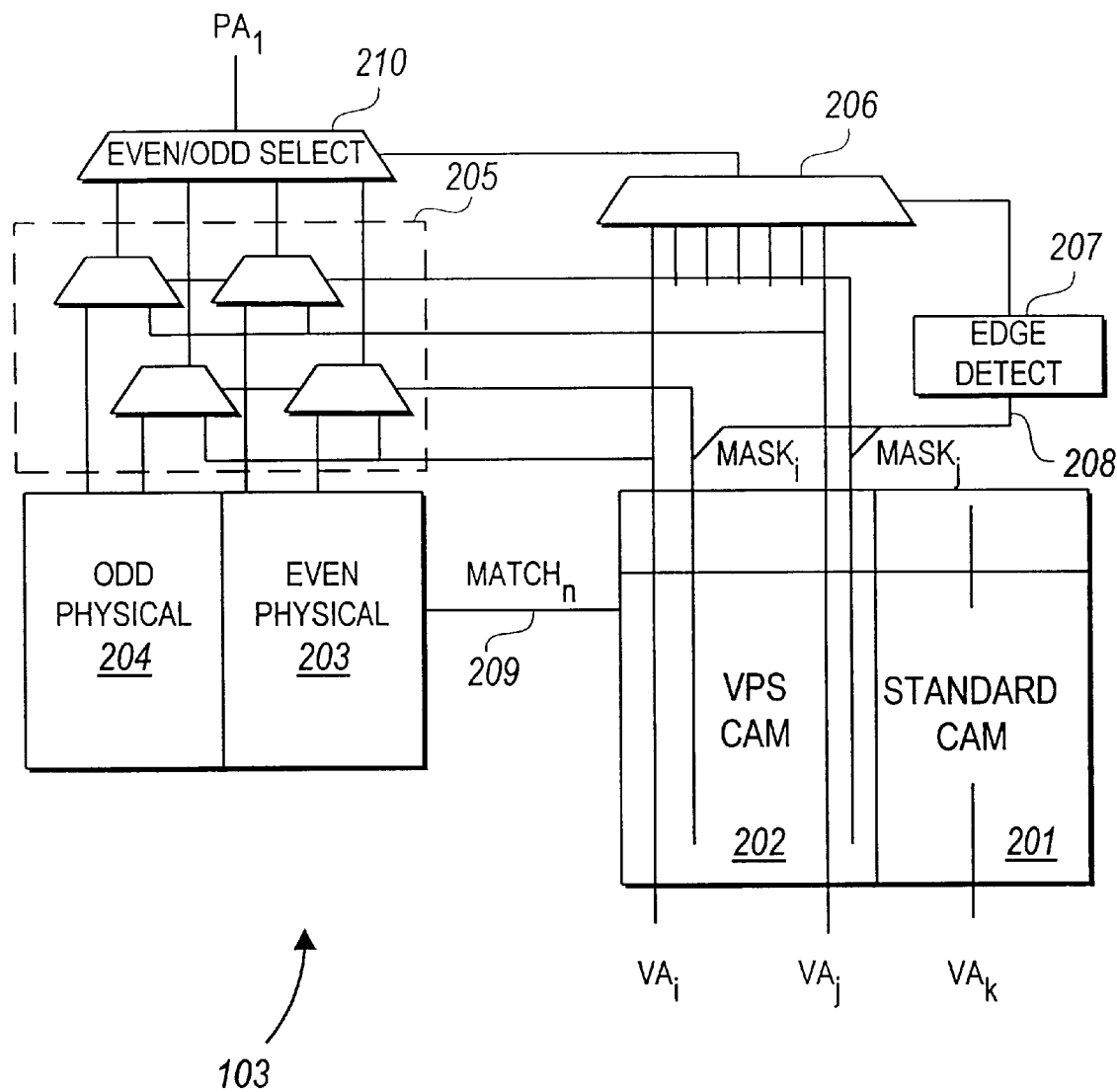
FIG. 2 is a block diagram of a second level joint data and instruction TLB (JTLB) 103 in microprocessor 100.

In this embodiment, JTLB 103 provides 96 page table entries in two RAM arrays, which are designated the even and the odd RAM arrays. FIG. 2 is a block diagram of JTLB 103. As shown in FIG. 2, a virtual memory address is provided to address content addressable memory (CAM) units 201 and 202 in JTLB 103. Unlike a cache tag access, in which only the untranslated bits of a virtual memory address is involved, CAM units 201 and 202 receive the translated bits of the virtual memory address. CAM unit 201 is a conventional content addressable memory for handling the portion of the virtual memory address which is always translated. CAM unit 202 is implemented using a modified larger CAM cell which allows the bits of the CAM cell to be selectably preset by a masking bit pattern to be "always matching" (i.e. masked) regardless of their values. If all the translated bits in the virtual memory address provided match a stored virtual memory address in the CAM units 201 and 202, match line 209 remains high to signal a TLB hit. Match line 209 activate a word line in each of RAM arrays 203 and 204. RAM arrays 203 and 204 output two sets of physical memory address bits.

An edge detector 207 and multiplexers 205 together provide the masked bits of the virtual memory address as additional untranslated bits in place of the corresponding bits from RAM arrays 203 and 204. A priority circuit 206 and multiplexer 210 select between the two sets of physical memory address bits output from RAM arrays 203 and 204 to provide the translated physical address.

Because virtual-to-physical memory address translation through JTLB 103 is relatively more complex than a cache tag access, and because the virtual memory address must be completely computed (a 64 bit addition) before access to CAM units 201 and 202 can begin, the delay incurred in the virtual-to-physical memory address translation through JTLB 103 is considerably longer than the delay of a cache tag access. Since microprocessor 100 initiates a cache tag access simultaneously with virtual-to-physical address translation, and since a complete cache access requires the translated physical memory address to perform set selection, this delay through JTLB 103 is a limiting delay in the cache access. To remove this limitation to cache access, DTLB 101 is designed to provide a virtual-to-physical memory address translation which approximates the delay of the cache tag access, taking advantage that the result of the 64-bit addition yielding the virtual memory address can be predicted as soon as bit 15 of the result of the 64-bit addition is available. In this manner, virtual-to-physical memory address translation can begin before the virtual memory address computation is complete.

Figure 3:
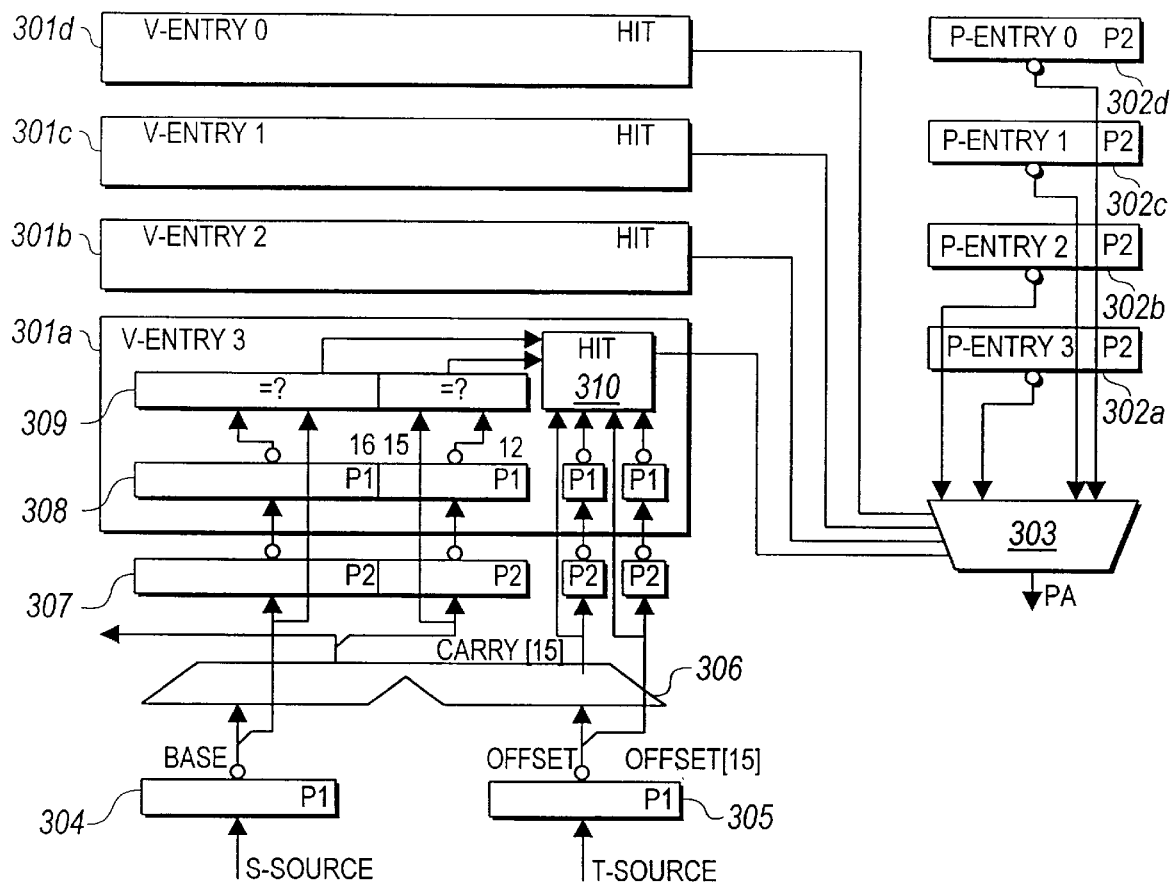
FIG. 3 is a block diagram showing DTLB 101 of the present invention and address adder 306 used in a virtual memory address computation.

FIG. 3 is a block diagram showing DTLB 101 and address adder 306, which is used in the 64-bit addition of a virtual memory address computation. As shown in FIG. 3, latches 304 and 305 provide respectively to 64-bit adder 306 the bass address and the offset value used in computing a virtual memory address. In addition to providing the 64-bit sum of the base and the offset, adder 306 also provides the carry bit between bit 15 and bit 16 of the 64-bit sum.

DTLB 101 comprises four identical entries for matching four virtual memory addresses to four physical addresses. Each entry comprises a virtual memory address matching circuit (i.e. one of circuits 301a–301d) and a corresponding physical address storage unit (i.e. one of circuits 302a–302d. Circuit 301a is shown in FIG. 3 in further detail. As shown in FIG. 3, circuit 301a comprises a storage unit 308, which stores the following components of a virtual memory address computation: (i) bits 16 to 63 of a base address, (ii) bits 12 to 15 of a virtual memory address output from adder 306, (iii) the carry bit 15 from the adder 306 and (iv) bit 15 of the offset. Storage unit 308 receives its input data from register 307, which is the input register for receiving input data into any of the four entries in DTLB 101.

Circuit 301a includes a comparator 309, which matches the current base address, bits 12 to 15 of the current sum, the current carry bit 15, and bit 15 of the current offset to the corresponding bits stored in storage unit 308. A DTLB hit occurs under any one of the six conditions shown in FIG. 4.

The conditions tabulated in FIG. 4 provide all conditions under which the current sum in adder 306 would generate a virtual memory address matching the virtual memory address represented in storage unit 308 (i.e. a DTLB "hit"). A DTLB hit results because, in adder 306, bits 16 to 63 of the base address are added to the sign extended bits of the offset value. Each of these sign extended bits has the same value of bit 15 (the "sign bit") of the offset value. Accordingly, if the present address computation is the same as the previous address computation, the following four-part condition is true: (i) bits 16 to 63 of the present and the previous base addresses are the same, (ii) the sign bit of the present offset value is the same as the sign bit of the previous offset value, (iii) carry bit 15 of the present sum is the same as the carry bit 15 of the previous sum (i.e. so that its affect on bits 16 to 63 in the resulting sum would be the same), and (iv) bits 12 to 15 of the present sum are the same as bits 12 to 15 of the previous sum. (Part (iv) of the four-part condition requires only bits 12 to 15 because bits 0 to 11 of a virtual memory address in this embodiment are not translated). Conditions 501 to 504 of FIG. 4 corresponds to instances in which the four-part condition is met.

There are two other conditions, corresponding to conditions 505 and 506, under which a DTLB hit can still occur, even though the above four-part condition is not met. Condition 505 represents an instance in which the stored previous virtual memory address computation involves adding a base address to a positive offset value, and the current virtual memory address computation involves adding a negative offset value to a base address having the same bits 16 to 63 as corresponding bits of the previous base address and yielding the same resulting virtual memory address because of an "overflow" or "wrap-around" in the 64-bit sum. Condition 506 corresponds to the converse situation when the current offset value is positive, and the stored previous offset value is negative, both virtual memory address computations yielding the same virtual memory address.

Thus, under any of the six conditions tabulated in FIG. 4, a DTLB hit can be determined as soon as bits 12 to 15 of the virtual memory address are computed. When a DTLB hit occurs at any one of DTLB 101's virtual memory address memory circuit 301a–301d the content of the corresponding one of physical memory address storage units 302a–302d is selected by multiplexer 303 as the physical memory address, which is then provided for set selection at data cache 120.

As a result of DTLB 101's approach of storing components of a virtual memory address computation, rather than the virtual memory address itself, a more than one entry in DTLB 101 may map the same virtual memory address. For example, redundant mapping may occur when bits 16 to 63 of a stored base address and the corresponding bits of the current base address differ only at bit position 16, and a carry out or borrow occur in either the previous or the current computation. This condition, which may result in both the previous and current address computations yielding the same physical address, is not detected by the match conditions. Although redundant mappings do not cause a correctness problem in DTLB 101's operation, redundant mappings reduce the effective size of DTLB 101. In practice, however, this reduction in effective size is insignificant.

When a DTLB miss occurs, an entry in DTLB 101 is replaced by data in register 306 and the corresponding physical memory address from JTLB 103. This replaced entry is selected using a "pseudo-least recently used" (PLRU) replacement policy. Under the PLRU replacement policy, the less recently used entry in the less recently used half of the DTLB 101 is replaced one of ordinary skill in the art would, of course, recognize that the current invention is not limited in any way by the entry replacement policy used in DTLB 101.

The above detailed description is provided to illustrate the specific embodiments of the present invention and is not intended to be limiting. Numerous modifications and variations within the scope of the present invention are possible. The present invention is defined by the following claims.

I claim:

1. A computer including a translation lookaside buffer, said translation lookaside buffer translating a virtual memory address to a physical memory address, said translation lookaside buffer comprising:

(i) a plurality of entry circuits, each entry circuit comprising:

a matching unit for comparing intermediate results and portions of operands of a current virtual memory address computation to corresponding intermediate results and corresponding portions of operands of a previous virtual memory address computation, said matching unit providing a signal when said intermediate results and said portions of operands of said current virtual memory address computation match said intermediate results and said portions of operands of said previous virtual memory address computation; and a storage unit for storing a physical address corresponding to the results of said previous virtual memory address computation; and (ii) a multiplexer, said multiplexer selecting as output data, when said signal is received from said matching unit of an entry circuit within said plurality of entry circuits, said physical address of said storage unit of said entry circuit.

2. A computer as in claim 1, further comprising an N-way set associative cache memory (N≧2), said cache memory performing set selection based on the value of said selected output data of said translation lookaside buffer.

3. A computer as in claim 2, said computer having first and second levels of translation lookaside buffers, wherein said translation lookaside buffer is implemented as a first level translation lookaside buffer.

* * * * *